United States Patent
Garnweidner et al.

(10) Patent No.: US 6,334,518 B1
(45) Date of Patent: Jan. 1, 2002

(54) DEVICE TO ABSORB IMPACT ENERGY

(75) Inventors: Peter Garnweidner, Lamprechtshausen; Christian Danninger, Strasswalchen, both of (AT)

(73) Assignee: Euromotive GesM.b.H., Ranshofen (AT)

(*) Notice: Subject to any disclaimer, the term of this patent is extended or adjusted under 35 U.S.C. 154(b) by 0 days.

(21) Appl. No.: 09/574,065

(22) Filed: May 18, 2000

(30) Foreign Application Priority Data

May 18, 1999 (DE) .......................... 199 22 779

(51) Int. Cl.[7] ................................. F16F 7/12
(52) U.S. Cl. ..................... 188/374; 267/64.15
(58) Field of Search .................. 188/374, 371, 188/322.22, 268, 317, 376, 322.19, 269; 267/64.15, 64.26, 116, 139; 293/133, 134

(56) References Cited

U.S. PATENT DOCUMENTS

| | | | | |
|---|---|---|---|---|
| 3,993,294 A | * | 11/1976 | Wossner et al. | 267/64.15 |
| 4,031,978 A | | 6/1977 | Tayler | |
| 4,988,081 A | * | 1/1991 | Dohrmann | 267/64.15 |
| 5,064,030 A | * | 11/1991 | Wossner | 188/269 X |
| 5,181,589 A | | 1/1993 | Siegner et al. | |
| 5,443,146 A | * | 8/1995 | Ayyildiz et al. | 188/374 |
| 6,027,105 A | * | 2/2000 | Dohrmann et al. | 267/139 |

FOREIGN PATENT DOCUMENTS

| | | |
|---|---|---|
| AT | 402 286 | 2/1997 |
| DE | 28 25 460 | 1/1979 |
| DE | 34 19 165 A1 | 11/1985 |
| DE | 93 10 036.1 | 10/1993 |
| DE | 44 03 127 C2 | 2/1995 |
| DE | 196 16 944 | 10/1997 |
| DE | 198 32 114 | 1/2000 |
| EP | 0 687 831 A1 | 12/1995 |
| WO | WO 97/19834 | 11/1996 |

* cited by examiner

Primary Examiner—Robert J. Oberleitner
Assistant Examiner—Melanie Torres
(74) Attorney, Agent, or Firm—Nixon Peabody LLP; David S. Safran

(57) ABSTRACT

A device to absorb impact energy between an impacted component and a component to be protected from the effects of the impact (in particular between the bumper bracket (1) and the frame side rail of a vehicle). The device has a deforming section (3) to plastically absorb energy (that is between the bumper bracket (1) and the frame rail), and a hydraulic part to elastically absorb energy. The hydraulic part is before the deforming part (3) (viewed in direction of impact) inside the frame side rail. With this design, it is possible to have a large plunger diameter for the hydraulic section and an aluminum construction.

4 Claims, 1 Drawing Sheet

DEVICE TO ABSORB IMPACT ENERGY

BACKGROUND OF THE INVENTION

1. Field of the Invention

The invention concerns a device to absorb impact energy between the impacted component and a component to be protected from the effects of the impact, in particular between the bumper bracket and the frame side rail of a vehicle with a shock-absorbing part to plastically absorb energy located between the impacted component and the component to be protected from the effects of the impact and a shock-absorbing part to elastically absorb energy.

2. Description of Related Art

A device of the type to which the invention is directed particularly serves to protect the frame and body of vehicles from damage due to the impact energy arising from an impact.

The device operates in three basic stages depending on the impact speed of the vehicle:

1. Elastic energy absorption occurs at low speeds so that vehicles can drive away without damage after a corresponding collision. Depending on guidelines and corresponding regulations, the elastic absorption of energy occurs between 4 and 8 km/h.
2. At average speeds up to 15 km/h, the frame side rail should be protected to keep down damage that requires repairs. Within this speed range, the frame side rail remains undamaged and the energy is absorbed by plastic deformation.
3. At high speeds, the frame side rail should absorb energy by buckling or folding after plastic energy absorption. The frame side rails should retain their position particularly at the front of the vehicle to prevent on-sided bending.

It is prior art in steel embodiments to install a hydraulic part for elastic energy absorption inside a deforming cylinder for plastically absorbing energy. Since the deforming cylinder must have a small diameter to attain the necessary deformation force, the hydraulic part (if it is in the deforming cylinder) must also be small so that it can work under high pressure.

While such a design is possible with steel embodiments since steel alloys can be used with a yield point of approx. 1000 MPa in conjunction with wall thicknesses of 6 mm, an aluminum design is impossible since the permissible stress is, of course, lower than that for steel. Hence, the hydraulic part is not inside but must be located outside the deforming cylinder in aluminum embodiments.

Placing the impact absorber between the impacted component, in particular the bumper bracket, and the component to be protected from the impact (in particular the frame side rail) is not possible since large block lengths are created with such a design that prevent the optimum exploitation of the deformation path of stage 2 (plastic energy absorption). To be understood as "block length" is the remaining component length of an energy absorbing element at which the level of force permissible for the use of the deformation path is exceeded. In extreme cases, the energy absorbing element acts rigid.

SUMMARY OF THE INVENTION

The problem on which the invention is based is therefore to design a device of the initially mentioned type so that it can be constructed out of aluminum without creating large block lengths.

This problem is solved according to the invention by placing the elastic energy absorbing part before the plastic energy absorbing part (viewed in direction of impact) inside the component that is to be protected from the effects of the impact energy.

This design makes it possible to use a hydraulic element with a large plunger diameter that operates with low hydraulic-fluid pressure. The required permissible stress and wall thickness of the fluid and gas cylinders of the hydraulic element are lower.

In the following, a particularly preferred exemplary embodiment of the invention will be further described with reference to the accompanying drawings.

DETAILED DESCRIPTION OF THE PREFERRED EMBODIMENT

Figure 1:
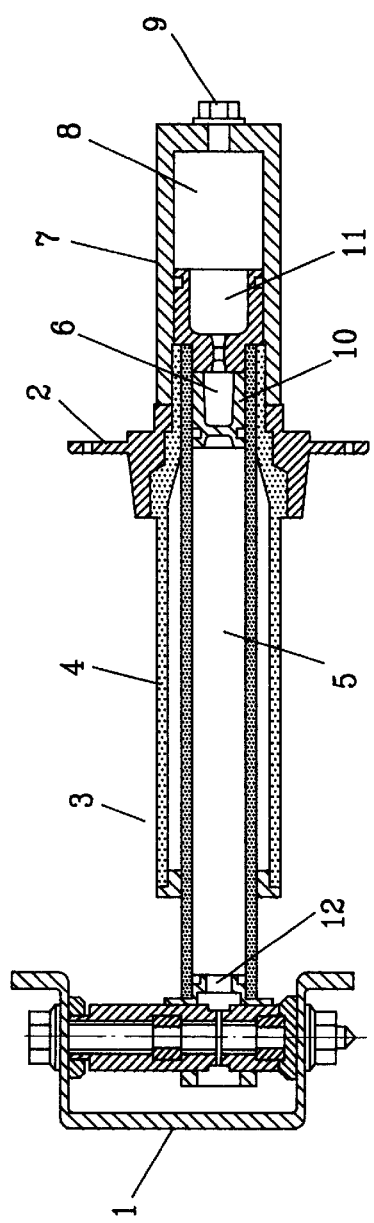
FIGS. 1–3 each is a lengthwise cross-sectional view of a preferred embodiment of the device according to the invention in a respective one of three operating phases.

The device in the drawing for absorbing impact energy between the bumper bracket 1 and the frame side rail of a vehicle comprises a deforming part 3 with a deforming cylinder 4 which is in a reducing cylinder section 2 connected to the frame side rail of the vehicle. Such a deforming part 3 is, e.g., prior art from Austrian Patent AT 402 186 B.

In the deforming cylinder 4, there is a gas cylinder 5 that surrounds a gas component which can be filled with gas through a filling valve 12. Following the gas cylinder 5 after the reducing cylinder 2 (i.e., at the frame side rail of the vehicle) is a hydraulic part for elastically absorbing impact energy that is designed similar to a shock absorber and is essentially composed of a gas plunger 10 and a hydraulic fluid or oil plunger 11 with a throttle valve to the gas piston 10 that can be in a fluid cylinder 7 that is fixed to the outside of the deforming cylinder 4. In the fluid cylinder, there is a fluid chamber 8 that is accessible via a screw plug 9. A second fluid chamber 6 is in the gas plunger 10.

The fluid cylinder 7 is preferably screwed to the deforming cylinder 4 to create a tight connection between the two components.

To fill the assembly, the gas plunger 10 is placed at a distance of, e.g., 2 mm from the fluid plunger 11; fluid is then injected into the opening that can be sealed with the screw plug 9, and the screw plug 9 is then screwed tight. The gas section is then filled to a few bar overpressure via valve 12 so that the entire assembly is under an overpressure between the fluid plunger 11 and the gas plunger 10.

In the following, the function of the device will be described with reference to FIGS. 1–3.

Figure 2:
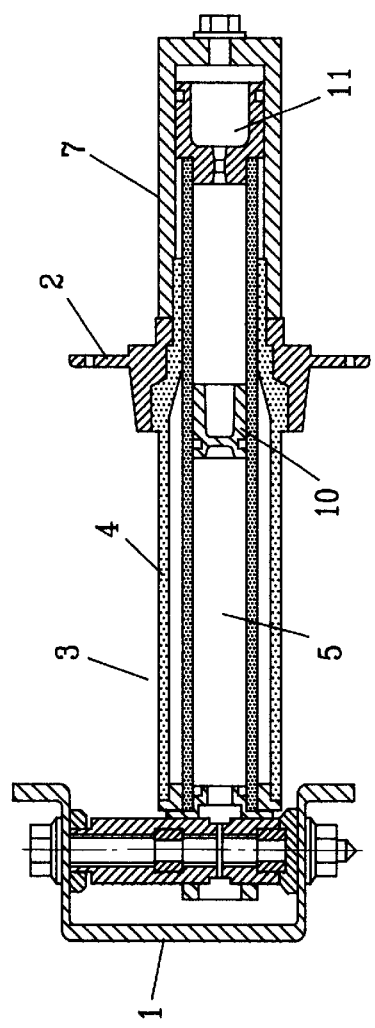

In the first stage, at an impact speed of 4–8 km/h, force is introduced starting with the arrangement in FIG. 1 via the bumper 1 that is conveyed by the cylinder surrounding the gas section 5, i.e., the gas cylinder, to the fluid plunger 11. The fluid is pressed from the first fluid chamber 8 in the fluid cylinder 7 via the throttle valve in the fluid chamber 11 into the second fluid chamber 6 in the gas plunger 10. The gas plunger 10 is moved, and the gas in the gas section in the gas cylinder 5 is further compressed. The impact energy is hence first decreased by the hydraulic part in the fluid cylinder 7 and then by the gas part, i.e., essentially by the gas section in the gas cylinder 5. The arrangement of the device after the hydraulic part that elastically absorbs energy has been compressed is shown in FIG. 2.

At the above-cited low speeds, no plastic deformation occurs.

At higher speeds, for the second stage, the hydraulic section does not react first so that there is no elastic energy absorption at the beginning of the transmission of impact energy. This is because the impact force that arises at higher collision speeds exceeds the deformation force of the deforming cylinder 4 since the volume to be compressed through the throttle valve in the fluid plunger 11 is too great, and the hydraulic part acts as a rigid element.

Figure 3:
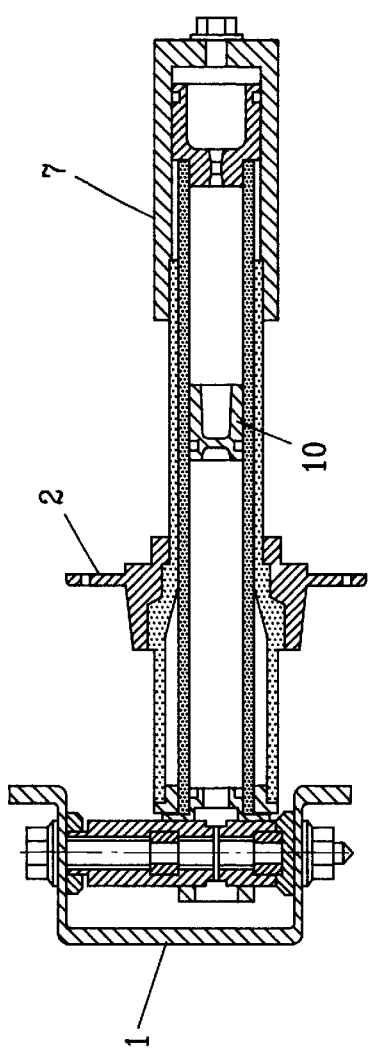

The energy at high collision speeds is therefore first reduced by the deformation of the deforming cylinder 4 as shown in FIG. 3. The deforming cylinder 4 is pressed by the reducing cylinder 2 to compress it to a small outer diameter until the impact force has fallen enough for the hydraulic section to react. At the end of the energy absorbing process, elastic energy absorption occurs as the hydraulic part is compressed. The final state is shown in FIG. 3.

By coupling the transmission of force of the first and second stage, the permissible lengthwise force of the frame side rail is not exceeded in the respective speed range.

The deforming part 3, in the above preferred embodiment that is comprised of a deforming cylinder 4 and a reducing cylinder 2 can also be constructed in the form of a cylinder that can absorb impact energy by buckling or folding.

While a single embodiment in accordance with the present invention has been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

What is claimed is:

1. A device to absorb impact energy between an impacted component and a component to be protected from the effects of an impact, comprising a plastic energy shock-absorbing part to plastically absorb energy located between the impacted component and the component to be protected from the effects of the impact and an elastic energy absorbing part to elastically absorb energy; wherein the elastic energy absorbing part is forward of the plastic energy absorbing part viewed in a direction of impact and inside of the component that is to be protected from the effects of the impact energy, wherein said plastic energy shock-absorbing part comprises a deforming cylinder and a reducing cylinder, said reducing cylinder being mounted so as to surround said deforming cylinder, said deforming cylinder moving into said reducing cylinder so as to be compressed by said reducing cylinder upon impact.

2. A device according to claim 1, wherein the elastic energy absorbing part is a hydraulic part.

3. A device according to claim 2, wherein the hydraulic part comprises a fluid cylinder, a fluid plunger with a throttle valve and a gas plunger, said gas plunger acting on gas in a gas compartment of a gas cylinder that is surrounded by the deforming cylinder of said plastic energy absorbing part.

4. A device according to claim 1, wherein the device is constructed of aluminum components.

* * * * *